United States Patent
Osaka

(10) Patent No.: US 12,448,480 B2
(45) Date of Patent: Oct. 21, 2025

(54) CURABLE EPOXY COMPOSITION FOR ROTARY ELECTRIC MACHINE

(71) Applicant: DAICEL CORPORATION, Osaka (JP)

(72) Inventor: Takuya Osaka, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 236 days.

(21) Appl. No.: 17/926,434

(22) PCT Filed: May 19, 2021

(86) PCT No.: PCT/JP2021/018958
§ 371 (c)(1),
(2) Date: Nov. 18, 2022

(87) PCT Pub. No.: WO2021/235480
PCT Pub. Date: Nov. 25, 2021

(65) Prior Publication Data
US 2023/0183414 A1    Jun. 15, 2023

(30) Foreign Application Priority Data

May 21, 2020 (JP) ................................. 2020-088814
Dec. 14, 2020 (JP) ................................. 2020-206402

(51) Int. Cl.
| | |
|---|---|
| C08G 59/20 | (2006.01) |
| C08G 59/02 | (2006.01) |
| C08G 59/22 | (2006.01) |
| C08G 59/42 | (2006.01) |
| C08G 59/68 | (2006.01) |
| C08K 5/00 | (2006.01) |
| C08K 5/3445 | (2006.01) |
| C08L 63/00 | (2006.01) |

(52) U.S. Cl.
CPC ............. C08G 59/02 (2013.01); C08G 59/22 (2013.01); C08G 59/223 (2013.01); C08G 59/4238 (2013.01); C08K 5/0025 (2013.01); C08K 5/3445 (2013.01)

(58) Field of Classification Search
None
See application file for complete search history.

(56) References Cited

U.S. PATENT DOCUMENTS

| | | | |
|---|---|---|---|
| 7,825,197 B2 | 11/2010 | Takai et al. | |
| 9,200,133 B2 | 12/2015 | Sakane | |
| 9,960,646 B2 | 5/2018 | Sasajima | |
| 2009/0023843 A1* | 1/2009 | Beisele ................ | C08K 5/3435 524/99 |
| 2010/0193831 A1* | 8/2010 | Sato ..................... | C08G 59/226 524/323 |
| 2013/0131216 A1* | 5/2013 | Sakane ................ | C09D 163/00 523/451 |
| 2013/0131217 A1* | 5/2013 | Karunakaran ......... | C08G 59/42 523/456 |
| 2013/0162063 A1 | 6/2013 | Sasajima | |
| 2013/0241086 A1 | 9/2013 | Sakane | |
| 2013/0303661 A1 | 11/2013 | Oka et al. | |

FOREIGN PATENT DOCUMENTS

| | | |
|---|---|---|
| CN | 1282105 A | 1/2001 |
| CN | 103249753 A | 8/2013 |
| CN | 103387737 A * | 11/2013 |
| EP | 0 198 498 A2 | 10/1986 |
| JP | 61-261317 A | 11/1986 |
| JP | 62-545 A | 1/1987 |
| JP | 64-60624 A | 3/1989 |
| JP | 2007-308683 A | 11/2007 |
| JP | 2008-81560 A | 4/2008 |
| JP | 2010-100728 A | 5/2010 |
| JP | 2013-138611 A | 7/2013 |
| JP | 2015-218180 A | 12/2015 |
| JP | 2016-210928 A | 12/2016 |
| JP | 2019-131629 A | 8/2019 |
| JP | 2019-199587 A | 11/2019 |
| WO | WO 2011/078205 A1 | 6/2011 |
| WO | WO 2012/073666 A1 | 6/2012 |

(Continued)

OTHER PUBLICATIONS

Machine translation of CN-103387737-A (no date).*
Machine translation of JP-6460624-A (no date).*
Machine translation of WO-2012093591-A1 (no date).*
Machine translation of WO-2013035542-A1 (no date).*
Japanese Office Action for Japanese Application No. 2022-073188, dated Jul. 9, 2024, with English translation.
International Search Report and Written Opinion of the International Searching Authority for International Application No. PCT/JP2021/018958, dated Jul. 27, 2021, with English Translation.

(Continued)

*Primary Examiner* — Michael J Feely

(74) *Attorney, Agent, or Firm* — Birch, Stewart, Kolasch & Birch, LLP

(57) ABSTRACT

Provided is a curable epoxy composition capable of forming a cured product having excellent heat resistance even in a high temperature environment. A first curable epoxy composition includes an alicyclic epoxy compound (A) having an alicyclic structure and an epoxy group in a molecule, an acid anhydride-based curing agent (B), and an imidazole-based curing accelerator (C), and is liquid at 25° C. and to be used for a rotary electric machine. A second curable epoxy composition includes an alicyclic epoxy compound (A) having an alicyclic structure and an epoxy group in a molecule, an acid anhydride-based curing agent (B), an imidazole-based curing accelerator (C), and a polyester polyol (D), and is to be used for a rotary electric machine.

18 Claims, No Drawings

(56) References Cited

FOREIGN PATENT DOCUMENTS

| WO | WO-2012093591 A1 | * | 7/2012 | ........... | C08G 59/226 |
| WO | WO-2013035542 A1 | * | 3/2013 | ............. | C08G 59/24 |

OTHER PUBLICATIONS

Extended European Search Report for European Application No. 21809180.9, dated Apr. 19, 2024.
Chinese Office Action and Search Report for Chinese Application No. 202180036404.4, dated Dec. 31, 2024.

* cited by examiner

CURABLE EPOXY COMPOSITION FOR ROTARY ELECTRIC MACHINE

TECHNICAL FIELD

The present disclosure relates to a curable epoxy composition to be used in a rotary electric machine. More particularly, the present disclosure relates in one embodiment to a curable epoxy composition for forming a cured product to be used in a stator or rotor in a rotary electric machine. The present application claims priority from the Japanese Patent Application No. 2020-088814 filed in Japan on May 21, 2020 and the Japanese Patent Application No. 2020-206402 filed in Japan on Dec. 14, 2020, the contents of which are incorporated herein by reference.

BACKGROUND ART

Epoxy resins are used as a resin (sealing material) to cover an optical semiconductor element in an optical semiconductor apparatus, a resin for a molded coil that is casted with an impregnated coil such as an ignition coil, a resin for a fiber-reinforced resin, a resin for a rotary electric machine (e.g., an insulating material, an adhesive resin to fix a permanent magnet, or a filler for a gap), and the like (for example, see Patent Documents 1 to 4).

For example, Patent Document 3 discloses a fixing resin composition used for the formation of a fixing member in a rotor including a rotor core fixed to a rotary shaft and provided with a plurality of holes disposed along a peripheral edge portion of the rotary shaft, a magnet inserted into the hole, and the fixing member, as a separation portion between the hole and the magnet, provided on a magnet side wall located at least on an inner peripheral edge side of the rotor core to fix the magnet.

CITATION LIST

Patent Document

Patent Document 1: JP 2007-308683 A
Patent Document 2: JP 2010-100726 A
Patent Document 3: JP 2013-138611 A
Patent Document 4: JP 2019-199587 A

SUMMARY OF INVENTION

Technical Problem

In recent years, for example, an automobile has an EV motor downsized and highly functionalized, and thus the operating environment temperature of the EV motor may reach 180° C. or higher. If the EV motor uses a resin having low heat resistance, the EV motor may operate improperly under such a high temperature environment. Therefore, a resin having excellent heat resistance even in a high temperature environment has been desired. However, the resins formed from the resin compositions specifically disclosed in Patent Documents 1 to 4 may not have satisfied sufficient heat resistance.

Therefore, an object of the present disclosure is to provide a curable epoxy composition capable of forming a cured product having excellent heat resistance even in a high temperature environment.

Solution to Problem

As a result of intensive studies to achieve the above object, the inventor of the present disclosure has found that a cured product having excellent heat resistance can be formed even in a high temperature environment using a curable epoxy composition for a rotary electric machine that is a curable epoxy composition including an alicyclic epoxy compound having an alicyclic structure and an epoxy group in a molecule, an acid anhydride-based curing agent, and an imidazole-based curing accelerator. The present disclosure relates to inventions completed based on these findings.

The present disclosure provides a curable epoxy composition for a rotary electric machine that is a curable epoxy composition including an alicyclic epoxy compound (A) having an alicyclic structure and an epoxy group in a molecule, an acid anhydride-based curing agent (B), and an imidazole-based curing accelerator (C).

The present disclosure also provides, as one embodiment of the curable epoxy composition for a rotary electric machine, a curable epoxy composition for a rotary electric machine that is a curable epoxy composition including an alicyclic epoxy compound (A) having an alicyclic structure and an epoxy group in a molecule, an acid anhydride-based curing agent (B), and an imidazole-based curing accelerator (C), and is liquid at 25° C.

The curable epoxy composition for a rotary electric machine may include a polyester polyol (D).

The present disclosure also provides, as another embodiment of the curable epoxy composition for a rotary electric machine, a curable epoxy composition for a rotary electric machine that is a curable epoxy composition including an alicyclic epoxy compound (A) having an alicyclic structure and an epoxy group in a molecule, an acid anhydride-based curing agent (B), an imidazole-based curing accelerator (C), and a polyester polyol (D).

The polyester polyol (D) preferably includes a polyester polyol having a molecular weight of 600 or greater and a hydroxyl value of 200 KOH mg/g or less.

The proportion of the content of the alicyclic epoxy compound (A) in the epoxy compound content of the curable epoxy composition is preferably more than 70 mass %.

The proportion of the content of the acid anhydride-based curing agent (B) in the curing agent content of the curable epoxy composition is preferably more than 80 mass %.

The curable epoxy composition may include an inorganic filler (E).

The content of the inorganic filler (E) may be from 0.5 to 50 parts by mass with respect to 100 parts by mass of the total curable compound content of the curable epoxy composition.

The content of the inorganic filler (E) may be 100 parts by mass or greater with respect to 100 parts by mass of the total curable compound content of the curable epoxy composition.

The curable epoxy composition preferably has a viscosity of 330 mPa·s or greater at 25° C.

The acid anhydride-based curing agent (B) preferably includes methylnadic anhydride.

The imidazole-based curing accelerator (C) preferably includes one or more selected from the group consisting of 1-methylimidazole, 2-methylimidazole, 1-(2-hydroxypropyl)imidazole, an amine adduct of 1-methylimidazole, 2-methylimidazole, or 1-(2-hydroxypropyl)imidazole, and a latent curing accelerator containing one or more of 1-methylimidazole, 2-methylimidazole, 1-(2-hydroxypropyl)imidazole, and the amine adduct.

The curable epoxy composition may include one or more antioxidants selected from the group consisting of phenol-based antioxidants, hindered amine-based antioxidants, phosphorous-based antioxidants, and sulfur-based antioxidants.

The curable epoxy composition may include one or more polyhydric alcohols selected from the group consisting of ethylene glycol, diethylene glycol, propylene glycol, and glycerin.

The curable epoxy composition is preferably to be used for impregnating a stator coil of the rotary electric machine or used for fixing a magnet to fix a magnet inserted into a hole provided in a rotor core of the rotary electric machine to an inner wall of the hole.

The present disclosure also provides a cured product of the curable epoxy composition for a rotary electric machine.

The cured product preferably has a glass transition temperature of 180° C. or higher.

The cured product preferably has a bending strain of 4.4% or greater at 150° C.

The present disclosure also provides a stator for a rotary electric machine that is a stator including the cured product that is formed to cover a stator coil.

The present disclosure also provides a rotor for a rotary electric machine that is a rotor including the cured product covering a winding of the rotor.

Advantageous Effects of Invention

According to the curable epoxy composition for a rotary electric machine of the present disclosure, a cured product can be formed that has excellent heat resistance even in a high temperature environment. Therefore, when the curable epoxy composition is used in a rotary electric machine (especially a rotary electric machine for an automobile), the rotary electric machine can operate properly even at a high operating environment temperature.

DESCRIPTION OF EMBODIMENTS

Curable Epoxy Composition

The curable epoxy composition for a rotary electric machine according to one embodiment of the present disclosure (curable epoxy composition) is a curable (thermosetting) composition including at least an alicyclic epoxy compound (A) having an alicyclic structure and an epoxy group in a molecule, an acid anhydride-based curing agent (B), and an imidazole-based curing accelerator (C).

The curable epoxy composition preferably includes a polyester polyol (D). If the polyester polyol (D) is blended, the cured product obtained by curing the curable epoxy composition has a high glass transition temperature, excellent flexibility, and bending strain that is further improved. Thus, the cured product of the curable epoxy composition has heat resistance that is further improved. Furthermore, the curable epoxy composition may include an inorganic filler (E). Blending the inorganic filler (E) can impart thixotropy to the composition to suppress sedimentation of a powder that may be included in the composition, and blending the inorganic filler (E) can, for example, impart a low linear expansivity to the cured product.

The curable epoxy composition is preferably liquid at 25° C. The curable epoxy composition being liquid at 25° C. is excellent in workability such as an impregnation property and a casting property. The viscosity of the curable epoxy composition at 25° C. is not particularly limited, but is preferably 330 mPa·s or greater (for example, from 330 to 100000 mPa·s). If the viscosity is 330 mPa·s or greater, the composition does not drip off after impregnation, and the workability during impregnation and casting tends to improve. If the viscosity is 100000 mPa·s or less, the impregnation property and the workability during casting tend to improve, and a defect due to poor casting is less likely to occur in the cured product. The viscosity of the curable epoxy composition at 25° C. can be measured, for example, using a digital viscometer (model No. "DVU-EII", available from TOKIMEC INC.) under conditions: rotor: standard 1° 34'×R24; temperature: 25° C.; rotation speed: from 0.5 to 10 rpm.

In one aspect of the curable epoxy composition (for example, in a case where the inorganic filler (E) is not included), the viscosity of the curable epoxy composition at 25° C. is more preferably 400 mPa·s or greater (for example, from 400 to 10000 mPa·s), and still more preferably 450 mPa·s or greater (for example, from 450 to 1000 mPa·s). In another aspect of the curable epoxy composition (for example, in a case where the inorganic filler (E) is included), the viscosity of the curable epoxy composition at 25° C. is more preferably 2000 mPa·s or greater (for example, from 2000 to 100000), or 8000 mPa·s or greater (for example, from 8000 to 80000 mPa·s), and still more preferably 10000 mPa·s or greater (for example, from 10000 to 70000 mPa·s).

One embodiment of the curable epoxy composition is, for example, a curable epoxy composition for a rotary electric machine that is a curable epoxy composition including an alicyclic epoxy compound (A), an acid anhydride-based curing agent (B), and an imidazole-based curing accelerator (C) and is liquid at 25° C. Because the curable epoxy composition is liquid at 25° C., the curable epoxy composition is excellent in an impregnation property and a casting property and thus excellent in workability, and a cured product obtained by curing the curable epoxy composition has a high glass transition temperature and excellent heat resistance. Another embodiment of the curable epoxy composition is, for example, a curable epoxy composition for a rotary electric machine that is a curable epoxy composition including an alicyclic epoxy compound (A), an acid anhydride-based curing agent (B), an imidazole-based curing accelerator (C), and a polyester polyol (D). The cured product obtained by curing the curable epoxy composition has a high glass transition temperature, excellent flexibility, and bending strain that is further improved.

Alicyclic Epoxy Compound (A)

The alicyclic epoxy compound (A) is a compound having one or more alicyclic rings (alicyclic structures) and one or more epoxy groups (oxirane rings) in the molecule. The alicyclic epoxy compound (A) preferably has two or more epoxy groups in the molecule. A single type of alicyclic epoxy compound (A) may be used, or two or more thereof may be used.

As the alicyclic epoxy compound (A), a well-known or commonly used alicyclic epoxy compound can be used. Examples of the alicyclic epoxy compound (A) include, but are not particularly limited to, (I) a compound having an epoxy group (referred to as "alicyclic epoxy group"), which is a group constituted of two adjacent carbon atoms and an oxygen atom that constitute an alicyclic ring in the molecule; (II) a compound in which an epoxy group is directly bonded to an alicyclic ring through a single bond; and (III) a compound having an alicyclic ring and a glycidyl ether group in the molecule (a glycidyl ether type epoxy compound).

Examples of the compound (I) having an alicyclic epoxy group in the molecule include compounds having a cyclohexene oxide group, such as compounds represented by Formula (i):

[Chem. 1]

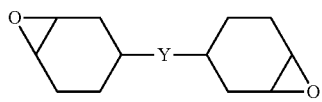
(i)

In Formula (i), Y represents a single bond or a linking group (a divalent group having one or more atoms). Examples of the linking group include a divalent hydrocarbon group, an epoxidized alkenylene group in which some or all of the carbon-carbon double bonds are epoxidized, a carbonyl group, an ether bond, an ester bond, a carbonate group, an amide group, and a linked group in which a plurality of the above groups are linked. Note that substituents such as alkyl groups may be bonded to one or more of the carbon atoms constituting the cyclohexane ring (cyclohexene oxide group) in Formula (i).

Examples of the divalent hydrocarbon group include a linear or branched alkylene group having from 1 to 18 carbon atoms and a divalent alicyclic hydrocarbon group. Examples of the linear or branched alkylene group having from 1 to 18 carbon atoms include a methylene group, a methylmethylene group, a dimethylmethylene group, an ethylene group, a propylene group, and a trimethylene group. Examples of the divalent alicyclic hydrocarbon group include divalent cycloalkylene groups (including a cycloalkylidene group), such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group.

Examples of the alkenylene group in the epoxidized alkenylene group in which some, or all of the carbon-carbon double bonds are epoxidized (the group thereof may be referred to as an "epoxidized alkenylene group") include linear or branched alkenylene groups having from 2 to 8 carbons, such as a vinylene group, a propenylene group, a 1-butenylene group, a 2-butenylene group, a butadienylene group, a pentenylene group, a hexenylene group, a heptenylene group, and an octenylene group. In particular, the epoxidized alkenylene group is preferably an epoxidized alkenylene group in which all of the carbon-carbon double bonds are epoxidized, and more preferably an epoxidized alkenylene group having from 2 to 4 carbons in which all of the carbon-carbon double bonds are epoxidized.

Representative examples of the alicyclic epoxy compound represented by Formula (i) include (3,4,3',4'-diepoxy) bicyclohexyl and compounds represented by Formulae (i-1) to (i-10). In Formulae (i-5) and (i-7), l and m each represent an integer from 1 to 30. R' in Formula (i-5) is an alkylene group having from 1 to 8 carbons, and, among these, a linear or branched alkylene group having from 1 to 3 carbons, such as a methylene group, an ethylene group, a propylene group, or an isopropylene group, is preferable. In Formulae (i-9) and (i-10), n1 to n6 each represent an integer from 1 to 30. In addition, other examples of the alicyclic epoxy compound represented by the formula (i) include 2,2-bis(3,4-epoxycyclohexyl)propane, 1,2-bis(3,4-epoxycyclohexan-1-yl)ethane, 1,2-epoxy-1,2-bis(3,4-epoxycyclohexan-1-yl)ethane, and bis(3,4-epoxycyclohexylmethyl)ether.

[Chem. 2]

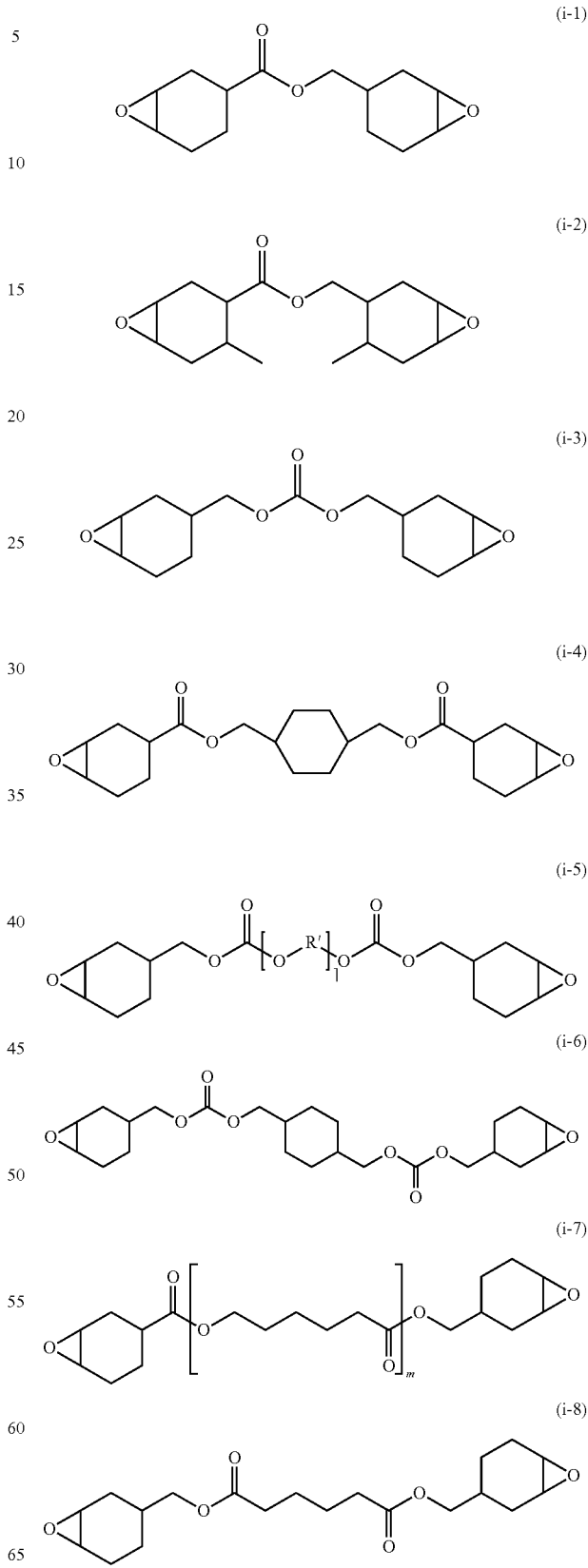

-continued

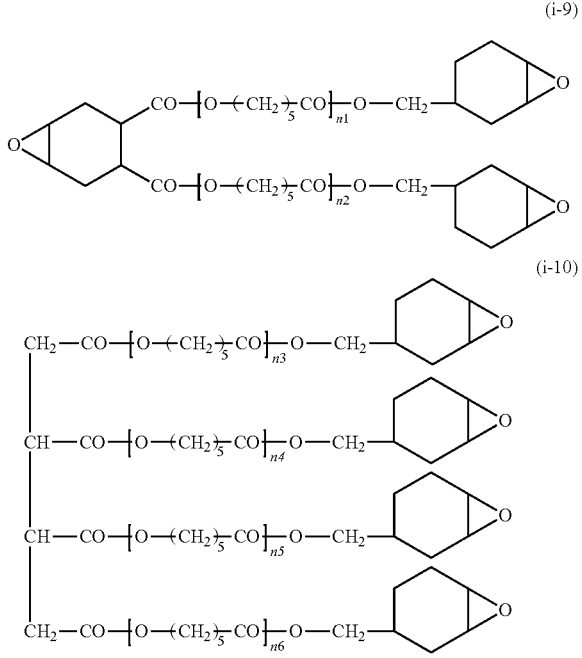

Examples of the compound (II) in which an epoxy group is directly bonded to an alicyclic ring through a single bond include compounds represented by Formula (ii).

[Chem. 4]

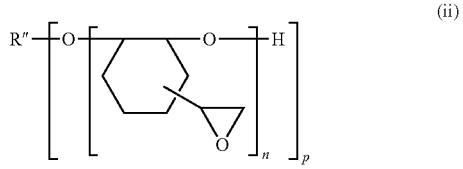

In Formula (ii), R" is a group resulting from elimination of a quantity of p hydroxyl groups (—OH) from a structural formula of a p-hydric alcohol (p-valent organic group), where p and n each represent a natural number. Examples of the p-hydric alcohol [R"(OH)$_p$] include polyhydric alcohols (such as alcohols having from 1 to 15 carbon atoms), such as 2,2-bis(hydroxymethyl)-1-butanol. Here, p is preferably from 1 to 6, and n is preferably from 1 to 30. When p is 2 or greater, n in each group in parentheses (in the outer parentheses) may be the same or different. Specific examples of the compound represented by Formula (ii) include a 1,2-epoxy-4-(2-oxiranyl)cyclohexane adduct of 2,2-bis(hydroxymethyl)-1-butanol (such as a product of the trade name "EHPE3150" (available from Daicel Corporation)).

Examples of the compound (III) having an alicyclic ring and a glycidyl ether group in the molecule include glycidyl ethers of alicyclic alcohols (in particular, alicyclic polyhydric alcohols). More particularly, examples thereof include compounds obtained by hydrogenating a bisphenol A type epoxy compound (hydrogenated bisphenol A type epoxy compounds), such as 2,2-bis[4-(2,3-epoxypropoxy)cyclohexyl]propane and 2,2-bis[3,5-dimethyl-4-(2,3-epoxypropoxy)cyclohexyl]propane; compounds obtained by hydrogenating a bisphenol F type epoxy compound (hydrogenated bisphenol F type epoxy compounds), such as bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, and bis[3,5-dimethyl-4-(2,3-epoxypropoxy)cyclohexyl]methane; a hydrogenated bisphenol type epoxy compound; a hydrogenated phenol novolac type epoxy compound; a hydrogenated cresol novolac type epoxy compound; a hydrogenated cresol novolac type epoxy compound of bisphenol A; a hydrogenated naphthalene type epoxy compound; a hydrogenated epoxy compound of an epoxy compound obtained from trisphenolmethane; and a hydrogenated epoxy compound of an epoxy compound having another aromatic ring.

The proportion of the content of the alicyclic epoxy compound (A) in the curable epoxy composition is preferably 10 mass % or greater with respect to the total amount (100 mass %) of the curable epoxy composition. In one aspect of the curable epoxy composition (for example, in a case where the inorganic filler (E) is not included), the proportion of the content of the alicyclic epoxy compound (A) is more preferably from 20 to 90 mass %, still more preferably from 30 to 70 mass %, and still even more preferably from 35 to 60 mass %. In another aspect of the curable epoxy composition (for example, in a case where the inorganic filler (E) is included), the proportion of the content of the alicyclic epoxy compound (A) is more preferably from 10 to 60 mass %, still more preferably from 12 to 55 mass %, and still even more preferably from 14 to 50 mass %.

The proportion of the alicyclic epoxy compound (A) in the epoxy compound content of the curable epoxy composition is preferably more than 70 mass %, and may be 75 mass % or greater, 80 mass % or greater, 85 mass % or greater, 90 mass % or greater, 95 mass % or greater, or 99 mass % or greater with respect to the total epoxy compound amount (100 mass %).

In the present description, the content of each component (such as the alicyclic epoxy compound (A) and the acid anhydride-based curing agent (B)) included in the curable epoxy composition can be appropriately selected from the range described, and thus each total content is 100 mass % or less.

Acid Anhydride-Based Curing Agent (B)

The acid anhydride-based curing agent (B) is a compound that has a function of curing the curable epoxy composition by reacting with a compound having an epoxy group such as the alicyclic epoxy compound (A). A single type of acid anhydride-based curing agent (B) may be used, or two or more thereof may be used.

As the acid anhydride-based curing agent (B), a well-known or commonly used acid anhydride-based curing agent can be used. Examples of the acid anhydride-based curing agent (B) include, but are not particularly limited to, methyltetrahydrophthalic anhydrides (such as 4-methyltetrahydrophthalic anhydride and 3-methyltetrahydrophthalic anhydride), methylhexahydrophthalic anhydrides (such as 4-methylhexahydrophthalic anhydride and 3-methylhexahydrophthalic anhydride), dodecenyl succinic anhydride, methyl endomethylene tetrahydrophthalic anhydride, phthalic anhydride, maleic anhydride, tetrahydrophthalic anhydride, hexahydrophthalic anhydride, methylcyclohexene dicarboxylic anhydride, pyromellitic anhydride, trimellitic anhydride, benzophenone tetracarboxylic anhydride, nadic anhydride, methylnadic anhydride, hydrogenated methylnadic anhydride, 4-(4-methyl-3-pentenyl)tetrahydrophthalic anhydride, succinic anhydride, adipic anhydride, sebacic anhydride, dodecanedioic anhydride, methylcylohexene tetracarboxylic anhydride, vinyl ether-maleic anhydride copolymers, and alkyl styrene-maleic anhydride copolymers.

Among these, the acid anhydride-based curing agent (B) is preferably an acid anhydride that is liquid at 25° C. (such as methyltetrahydrophthalic anhydride, methylhexahydrophthalic anhydride, dodecenyl succinic anhydride, or methyl endomethylene tetrahydrophthalic anhydride) from the viewpoint of handleability. Meanwhile, acid anhydrides that are solid at 25° C. tend to improve in handleability as a curing agent in the curable epoxy composition when, for example, dissolved in an acid anhydride that is liquid at 25° C. to form a liquid mixture.

Furthermore, the acid anhydride-based curing agent (B) preferably includes nadic anhydride or its derivative, such as nadic anhydride, methylnadic anhydride, or hydrogenated methylnadic anhydride, and more preferably includes methylnadic anhydride, from the viewpoint of further increasing the glass transition temperature of the cured product to further improve the heat resistance of the cured product.

The content (blending amount) of the acid anhydride-based curing agent (B) in the curable epoxy composition is not particularly limited, but is preferably from 50 to 200 parts by mass and more preferably from 80 to 150 parts by mass with respect to 100 parts by mass of the total amount of compounds having an epoxy group (such as the alicyclic epoxy compound (A)) included in the curable epoxy composition. More specifically, the acid anhydride-based curing agent (B) is preferably used in a proportion of from 0.5 to 1.5 equivalents (preferably from 0.8 to 1.1 equivalents, and more preferably 0.9 equivalents or greater and less than 1.0 equivalent) per equivalent of epoxy groups in all the compounds having an epoxy group included in the curable epoxy composition. If the content of the acid anhydride-based curing agent (B) is 50 parts by mass or greater, curing can sufficiently proceed, and the cured product tends to further improve in heat resistance and toughness. If the content of the acid anhydride-based curing agent (B) is 200 parts by mass or less, discoloration is suppressed, and the obtained cured product tends to have excellent hue. The proportion of the acid anhydride-based curing agent (B) in the curing agent content of the curable epoxy composition is preferably more than 80 mass %, and may be 85 mass % or greater, 90 mass % or greater, 95 mass % or greater, or 99 mass % or greater with respect to the total curing agent amount (100 mass %).

Imidazole-Based Curing Accelerator (C)

The imidazole-based curing accelerator (C) is a compound that has a function of accelerating the reaction rate when a compound having an epoxy group reacts with the acid anhydride-based curing agent (B). By using the imidazole-based curing accelerator (C) as a curing accelerator, a cured product having excellent heat resistance can be formed. A single type of imidazole-based curing accelerator (C) may be used, or two or more thereof may be used.

As the imidazole-based curing accelerator (C), a well-known or commonly used imidazole-based curing accelerator can be used. Examples of the imidazole-based curing accelerator (C) include, but are not particularly limited to, imidazole compounds such as 1-methylimidazole, 2-methylimidazole, 2-ethyl-4-methylimidazole, 1-(2-hydroxypropyl)imidazole, 2-undecylimidazole, 2-heptadecylimidazole, 2-phenylimidazole, 1-benzyl methylimidazole, 1-cyanoethyl-2-methylimidazole, 1-cyanoethyl-2-ethyl-4-methylimidazole, 1-cyanoethyl-2-undecylimidazole, 1-cyanoethyl-2-undecylimidazolium trimellitate, 1-cyanoethyl-2-phenylimidazolium trimellitate, 2-methylimidazolium isocyanurate, 2-phenylimidazolium isocyanurate, 2,4-diamino-6-[2-methylimidazolyl-(1)]-ethyl-s-triazine, and 2,4-diamino-6-[2-ethyl-4-methylimidazolyl-(1)]-ethyl-s-triazine.

The imidazole-based curing accelerator (C) may be a derivative of an imidazole compound, such as an amine adduct of the imidazole compound (such as an amine adduct with an epoxy compound). Examples of the epoxy compound include compounds exemplified and described as the alicyclic epoxy compound (A), aromatic epoxy compounds (aromatic epoxy resins), and aliphatic epoxy compounds (aliphatic epoxy resins). A single type of epoxy compound may be used, or two or more thereof may be used.

Examples of the aromatic epoxy compounds include epibis type glycidyl ether type epoxy resins obtained by a condensation reaction of a bisphenol (such as bisphenol A, bisphenol F, bisphenol S, or fluorenebisphenol) and an epihalohydrin (bisphenol type epoxy compounds such as bisphenol A type epoxy compounds and bisphenol F type epoxy compounds); high molecular weight epibis type glycidyl ether type epoxy resins obtained by further subjecting the above epibis type glycidyl ether type epoxy resins to an addition reaction with a bisphenol described above; novolac alkyl type glycidyl ether type epoxy resins obtained by subjecting a phenol (such as phenol, cresol, xylenol, resorcin, catechol, bisphenol A, bisphenol F, or bisphenol S) and an aldehyde (such as formaldehyde, acetaldehyde, benzaldehyde, hydroxybenzaldehyde, or salicylaldehyde) to a condensation reaction to obtain a polyhydric alcohol, and then further subjecting the polyhydric alcohol to a condensation reaction with an epihalohydrin; and epoxy compounds in which two phenol skeletons are bonded at the 9-position of a fluorene ring, and a glycidyl group is bonded directly or via an alkyleneoxy group to each oxygen atom resulting from eliminating a hydrogen atom from a hydroxyl group of these phenol skeletons.

Examples of the aliphatic epoxy compounds include glycidyl ethers of q-hydric alcohols having no cyclic structure (where q is a natural number); glycidyl esters of monovalent or polyvalent carboxylic acids (such as acetic acid, propionic acid, butyric acid, stearic acid, adipic acid, sebacic acid, maleic acid, and itaconic acid); epoxidized materials of fats and oils having a double bond, such as epoxidized linseed oil, epoxidized soybean oil, and epoxidized castor oil; and epoxidized materials of polyolefins (including polyalkadienes), such as epoxidized polybutadiene. Here, examples of the q-valent alcohol including no cyclic structure include monohydric alcohols, such as methanol, ethanol, 1-propyl alcohol, isopropyl alcohol, and 1-butanol; dihydric alcohols, such as ethylene glycol, 1,2-propanediol, 1,3-propanediol, 1,4-butanediol, neopentyl glycol, 1,6-hexanediol, diethylene glycol, triethylene glycol, tetraethylene glycol, dipropylene glycol, polyethylene glycol, and polypropylene glycol; and trihydric or higher polyhydric alcohols, such as glycerin, diglycerin, erythritol, trimethylolethane, trimethylolpropane, pentaerythritol, dipentaerythritol, and sorbitol. In addition, the q-hydric alcohol may be a polyether polyol, a polyester polyol, a polycarbonate polyol, a polyolefin polyol, or the like.

The imidazole-based curing accelerator (C) preferably includes, among the above-described compounds, at least 1-methylimidazole, 2-methylimidazole, 1-(2-hydroxypropyl)imidazole, or an amine adduct of one of these compounds (in particular, an amine adduct with an epoxy compound, and more preferably an amine adduct with a bisphenol-type epoxy compound) from the viewpoint of further increasing the glass transition temperature of the cured product to further improve the heat resistance of the cured product. The imidazole-based curing accelerator (C) preferably includes, among these compounds, 1-(2-hydroxypropyl)imidazole or an amine adduct as described above (in particular, an amine adduct with an epoxy compound), and more preferably an amine adduct as described above, still more preferably an amine adduct of 2-methylimidazole and an epoxy compound, and particularly preferably an amine adduct of 2-methylimidazole and a bisphenol-type epoxy compound, from the viewpoint of achieving excellent storage stability (shelf life) in a state of being mixed with the acid anhydride-based curing agent (B).

The imidazole-based curing accelerator (C) may be blended as a latent curing accelerator. By using a latent curing accelerator, the storage stability of the curable epoxy composition can be improved. Examples of the latent curing accelerator include those obtained by microencapsulating the imidazole-based curing accelerator (C) (microcapsule-type latent curing agents).

The microcapsule-type latent curing agent includes, for example, a core and a shell covering the surface of the core, and the core includes the imidazole-based curing accelerator (C) and the shell includes an organic polymer and/or an inorganic compound. Note that the microcapsule-type latent curing agent in a case where the shell is an inorganic compound does not correspond to the inorganic filler (E).

The content of the shell is preferably from 0.01 to 100 parts by mass, more preferably from 0.1 to 80 parts by mass, still more preferably from 1 to 60 parts by mass, and particularly preferably from 5 to 50 parts by mass with respect to 100 parts by mass of the core content. If the content of the shell is within the above range, both excellent storage stability and excellent curability can be achieved.

Examples of the organic polymer include natural polymers such as cellulose and synthetic resins. Among these, synthetic resins are preferable from the viewpoint of achieving more excellent storage stability, easier breakage of the shell during curing, and the cured product having more uniform physical properties.

Examples of the synthetic resins include epoxy resins, acrylic resins, polyester resins, phenol resins, polyethylene resins, nylon resins, polystyrene resins, urea resins, urethane resins, and mixtures and copolymers thereof.

Examples of the inorganic compound include boron compounds such as boron oxide and borates, silicon dioxide, and calcium oxide. Among these, boron oxide is preferable from the viewpoint of achieving more excellent film stability and easier breakage during heating.

The content (blending amount) of the imidazole-based curing accelerator (C) in the curable epoxy composition is not particularly limited, but is preferably from 0.01 to 5 parts by mass, more preferably from 0.03 to 3 parts by mass, and still more preferably from 0.1 to 2 parts by mass with respect to 100 parts by mass of the total amount of curable compounds (for example, a compound having reactivity by a curing agent, such as a compound having an epoxy group or a polyol) included in the curable epoxy composition. If the content of the imidazole-based curing accelerator (C) is 0.01 parts by mass or greater, the heat resistance is further improved, and a more efficient curing acceleration effect tends to be obtained. If the polyester polyol (D) is included, the cured product is excellent in both heat resistance and bending strain. If the content of the imidazole-based curing accelerator (C) is 5 parts by mass or less, discoloration is suppressed, and the obtained cured product tends to have excellent hue. In a case where the imidazole-based curing accelerator (C) is blended as a latent curing accelerator, the content as a latent curing accelerator (for example, the total content of the core and the shell) is, for example, from 0.6 to 10 parts by mass, and preferably from 2 to 8 parts by mass with respect to 100 parts by mass of the total curable compound content of the curable epoxy composition. The proportion of the imidazole-based curing accelerator (C) in the curing accelerator content of the curable epoxy composition is preferably 50 mass % or greater, and may be 60 mass % or greater, 75 mass % or greater, 90 mass % or greater, 95 mass % or greater, or 99 mass % or greater with respect to the total curing accelerator amount (100 mass %).

Polyester Polyol (D)

Examples of the polyester polyol (D) include compounds having two or more hydroxy groups and two or more ester bonds in the molecule. Examples of the polyester polyol include polylactone polyols such as polycaprolactone polyol, aliphatic polyester polyols, aromatic polyester polyols, and alicyclic polyester polyols. A single type of polyester polyol (D) may be used, or two or more thereof may be used.

The polyester polyol (D) preferably includes, among these compounds, a polylactone polyol and/or an aliphatic polyester polyol from the viewpoint of achieving more excellent flexibility while the cured product maintains a high glass transition temperature. From a similar viewpoint, the polyester polyol (D) preferably includes a polyester diol and/or a polyester triol.

The molecular weight of the polyester polyol (D) is not particularly limited, but is preferably 250 or greater, more preferably 600 or greater, still more preferably 1100 or greater, and particularly preferably 1700 or greater. If the molecular weight is 250 or greater (in particular, 600 or greater), the toughness of the cured product is easily improved, and the bending strain is further improved. The molecular weight may be, for example, 100000 or less, 50000 or less, 10000 or less, or 4000 or less. The molecular weight of the polyester polyol (D) means a number average molecular weight measured by gel permeation chromatography (GPC) and calibrated with a polystyrene standard.

The hydroxyl value of the polyester polyol (D) is not particularly limited, but is preferably 600 KOH mg/g or less, more preferably 200 KOH mg/g or less, still more preferably 100 KOH mg/g or less, and particularly preferably 80 KOH mg/g or less. If the hydroxyl value is 600 KOH mg/g or less (in particular, 200 KOH mg/g or less), the chain transfer reaction of the polymerization of the alicyclic epoxy compound (A) is suppressed, the degree of polymerization of the epoxy main chain tends to be high, and the cured product can maintain a high glass transition temperature. The hydroxyl value can be measured with a potentiometric titration method in accordance with JIS K 0070.

In a case where the curable epoxy composition includes the polyester polyol (D), the proportion of the content of the polyester polyol (D) in the curable epoxy composition is not particularly limited, but is preferably from 1 to 30 mass %, more preferably from 3 to 20 mass %, and still more preferably from 5 to 15 mass % with respect to the total amount (100 mass %) of the curable epoxy composition. If the proportion of the content is within the above range, the cured product is further excellent in both heat resistance and bending strain.

Inorganic Filler (E)

As the inorganic filler (E), a well-known or commonly used inorganic filler can be used. Examples of the inorganic filler (E) include, but are not particularly limited to, powders of silica, alumina, zircon, calcium silicate, calcium phosphate, calcium carbonate, magnesium carbonate, silicon carbide, silicon nitride, aluminum nitride, boron nitride, aluminum hydroxide, iron oxide, zinc oxide, zirconium oxide, magnesium oxide, titanium oxide, aluminum oxide, calcium sulfate, barium sulfate, forsterite, steatite, spinel, clay, kaolin, dolomite, hydroxyapatite, nepheline syenite, cristobalite, wollastonite, diatomaceous earth, talc, and the like, and molded bodies (for example, spheroidized beads) thereof. Examples of the inorganic filler (E) also include those obtained by well-known or commonly used surface treatment of an inorganic filler described above. A single type of inorganic filler (E) may be used, or two or more types may be used. Among these inorganic fillers, silica, alumina, and aluminum nitride are preferable, and silica (a silica filler) is more preferable as the inorganic filler (E) from the viewpoint that the cured product has a low liner expansion coefficient and warpage of the cured product is less likely to occur.

The silica is not particularly limited, and well-known or commonly used silica such as fused silica, crystalline silica, and high-purity synthetic silica can be used. As the silica, silica subjected to a well-known or commonly used surface treatment (for example, a surface treatment with a surface treatment agent such as a metal oxide, a silane coupling agent, a titanium coupling agent, an organic acid, a polyol, or silicone) can also be used.

Examples of the silica include hydrophilic silica and hydrophobic silica, and hydrophobic silica is preferable from the viewpoint of easily increasing the viscosity of the curable epoxy composition, suppressing sedimentation of solid components such as the microcapsule-type latent curing agent to improve the dispersibility, and imparting thixotropy to the curable epoxy composition to achieve excellent workability such impregnation and casting properties.

The hydrophobic silica is silica obtained by subjecting hydrophilic silica to a hydrophobization treatment. Examples of the treatment agent used in the hydrophobization treatment include organic silyl compounds such as methyltrichlorosilane, dimethyldichlorosilane, trimethylchlorosilane, hexamethyldisilazane, methyltrialkoxysilane, dimethyldialkoxysilane, trimethylalkoxysilane, ethyltrichlorosilane, propyltrichlorosilane, hexyltrichlorosilane, long-chain alkyltrichlorosilane, ethyltrialkoxysilane, propyltrialkoxysilane, hexyltrialkoxysilane, long-chain alkyltrialkoxysilane, methacrylsilane, fluoroalkylsilane, and perfluoroalkylsilane and silicone compounds such as dimethylpolysiloxane (silicone oil), methylphenylpolysiloxane, methylhydrogenpolysiloxane, and polysiloxanes of amino-modified silicone and the like. Among these, polysiloxanes are preferably used in the hydrophobization treatment. As the hydrophobization treatment method, a well-known method can be used to perform a hydrophobization treatment, and examples of the method include a liquid phase method, a gas phase method, and an autoclave method.

The shape of the silica is not particularly limited, and examples of the shape include a powder shape, a round shape, a crushed shape, a fibrous shape, a needle shape, and a scaly shape. Among these, round silica is preferable, and spherical silica (for example, round silica having an aspect ratio of 1.2 or less) is particularly preferable, from the viewpoint of dispersibility.

The specific surface area of the silica is not particularly limited, but is preferably 10 $m^2/g$ or greater, more preferably 40 $m^2/g$ or greater, and still more preferably 70 $m^2/g$ or greater, from the viewpoint of imparting thixotropy to the curable epoxy composition to achieve excellent workability such as impregnation and casting properties.

The median particle size of the silica is not particularly limited, but is preferably 200 nm or less, more preferably 100 nm or less, and still more preferably 50 nm or less, from the viewpoint of imparting thixotropy to the curable epoxy composition to achieve excellent workability such as impregnation and casting properties. The median particle size is, for example, 3 nm or greater. The median particle size is preferably from 0.1 to 50 µm, and more preferably from 0.1 to 30 µm from the viewpoint of improving the low linear expansivity, the strength, and the crack resistance of the cured product. The median particle size means a particle size at an integrated value of 50% in a particle size distribution (median diameter) measured with a laser diffraction/scattering method.

In a case where the curable epoxy composition includes the inorganic filler (E), the content (blending amount) of the inorganic filler (E) in the curable epoxy composition is not particularly limited, but is preferably from 0.5 to 500 parts by mass with respect to 100 parts by mass of the total curable compound content of the curable epoxy composition. In one aspect, the content is more preferably from 0.5 to 50 parts by mass, and more preferably from 1 to 10 parts by mass. In this case, thixotropy can be easily imparted to the composition. In another aspect, the content is more preferably 100 parts by mass or greater (for example, from 100 to 500 parts by mass), and more preferably 250 parts by mass or greater (for example, from 250 to 400 parts by mass). In this case, the linear expansivity of the cured product is easily reduced.

In a case where the curable epoxy composition includes the inorganic filler (E), the proportion of the content of the inorganic filler (E) in the curable epoxy composition is not particularly limited, but is preferably from 0.3 to 90 mass % with respect to the total amount (100 mass %) of the curable epoxy composition. In one aspect, the proportion of the content is more preferably from 0.3 to 8 mass %, and more preferably from 0.5 to 3 mass %. In this case, thixotropy can be easily imparted to the composition. In another aspect, the proportion of the content is more preferably 50 mass % or greater (for example, from 50 to 90 mass %), and more preferably 55 mass % or greater (for example, from 55 to 80 mass %). In this case, the linear expansivity of the cured product is easily reduced.

The curable epoxy composition may include a curable compound other than the alicyclic epoxy compound (A) and the polyester polyol (D) (a compound that can react by a curing agent such as the acid anhydride-based curing agent (B)). The proportion of the total content of the alicyclic epoxy compound (A) and the polyester polyol (D) in the curable compounds in the curable epoxy composition is preferably 50 mass % or greater, more preferably 60 mass % or greater, even more preferably 70 mass % or greater, yet even more preferably 80 mass % or greater, still even more preferably 90 mass % or greater, and particularly preferably 95 mass % or greater with respect to the total amount (100 mass %) of all the curable compounds in the curable epoxy composition. In a case where the curable epoxy composition does not include the polyester polyol (D), the above-described proportion of the content is the proportion of the content of the alicyclic epoxy compound (A).

The proportion of the alicyclic epoxy compound (A) in the curable epoxy composition is preferably 50 mass % or greater, and may be 60 mass % or greater, 70 mass % or greater, or 75 mass % or greater with respect to the total curable compound content (100 mass %) in the curable epoxy composition. The proportion of the polyester polyol (D) in the curable epoxy composition is preferably from 5 to 45 mass %, more preferably from 10 to 35 mass %, and still more preferably from 15 to 30 mass % with respect to the total curable compound content (100 mass %) in the curable epoxy composition. If the proportion is within the above range, the cured product is further excellent in both heat resistance and bending strain.

The curable epoxy composition may include another component in addition to the above-described components. If a compound having a hydroxyl group, such as ethylene glycol, diethylene glycol, propylene glycol, or glycerin, (in particular, a polyhydric alcohol other than the polyester polyol (D)) is included as another component, the reaction can proceed slowly. In addition, common additives can be used such as antifoamers such as silicone-based and fluorine-based antifoamers, leveling agents, coupling agents such as silane coupling agents of γ-glycidoxypropyltrimethoxysilane, 3-mercaptopropyltrimethoxysilane, and the like, surfactants, flame retardants, colorants, antioxidants, ultraviolet absorbers, ion adsorbents, coloring agents, phosphors (for example, inorganic phosphor fine particles such as YAG-based phosphor fine particles and silicate-based phosphor fine particles), mold release agents, thickeners, dispersants, rust inhibitors, corrosion inhibitors, freezing point depressants, and antiwear additives, as long as the viscosity and the transparency are not impaired. In particular in a case where 1-methylimidazole is used as the imidazole-based curing accelerator (C), an antifoamer and a leveling agent are preferably used from the viewpoint of reducing the viscosity to achieve an excellent impregnation property. A single type of each of the other components may be used, or two or more thereof may be used.

If an antioxidant described above is included, a cured product further excellent in heat resistance (in particular, yellowing resistance) can be formed. As the antioxidant, a well-known or commonly used antioxidant can be used. Examples of the antioxidant include, but are not particularly limited to, phenol-based antioxidants (phenol-based compounds), hindered amine-based antioxidants (hindered amine-based compounds), phosphorous-based antioxidants (phosphorous-based compounds), and sulfur-based antioxidants (sulfur-based compounds).

Examples of the phenol-based antioxidants include monophenols such as 2,6-di-t-butyl-p-cresol, butylated hydroxyanisole, 2,6-di-t-butyl-p-ethylphenol, and stearyl-β-(3,5-di-t-butyl-4-hydroxyphenyl) propionate; bis-phenols such as 2,2'-methylene-bis(4-methyl-6-t-butylphenol), 2,2'-methylene-bis(4-ethyl-6-t-butylphenol), 4,4'-thio-bis(3-methyl-6-t-butylphenol), 4,4'-butylidene bis(3-methyl-6-t-butylphenol), and 3,9-bis[1,1-dimethyl-2-{β-(3-t-butyl-4-hydroxy-5-methylphenyl)propionyloxy}ethyl] 2,4,8,10-tetraoxaspiro[5.5]undecane; and polymeric phenols such as 1,1,3-tris(2-methyl-4-hydroxy-5-t-butylphenyl) butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl) propionate] methane, bis [3,3'-bis-(4'-hydroxy-3'-t-butylphenyl)butyric acid] glycol ester, 1,3,5-tris (3',5'-di-t-butyl-4'-hydroxybenzyl)-s-triazine-2,4,6-(1H,3H,5H) trione, and tocophenol.

Examples of the hindered amine-based antioxidants include bis (1,2,2,6,6-pentamethyl-4-piperidyl)[[3,5-bis (1,1-dimethyl ethyl)-4-hydroxyphenyl]methyl]butyl malonate, bis(1,2,2,6,6-pentamethyl-4-piperidyl) sebacate, methyl-1,2,2,6,6-pentamethyl-4-piperidyl sebacate, and 4-benzoyloxy-2,2,6,6-tetramethylpiperidine.

Examples of the phosphorous-based antioxidants include phosphites (phosphite-based antioxidants) such as triphenyl phosphite, diphenylisodecyl phosphite, phenyldiisodecyl phosphite, tris(nonylphenyl) phosphite, diisodecyl pentaerythritol phosphite, tris(2,4-di-t-butylphenyl) phosphite, cyclic neopentanetetrayl bis(octadecyl)phosphite, cyclic neopentanetetrayl bis (2,4-di-t-butylphenyl) phosphite, cyclic neopentanetetrayl bis (2,4-di-t-butyl-4-methylphenyl) phosphite, and bis [2-t-butyl-6-methyl-4-{2-(octadecyloxycarbonyl)ethyl}phenyl] hydrogen phosphite; and oxaphosphaphenanthrene oxides such as 9,10-dihydro-9-oxa-10-phosphaphenanthrene-10-oxide and 10-(3,5-di-t-butyl-4-hydroxybenzyl)-9,10-dihydro-9-oxa-10-phosphaphenanthrene-10-oxide.

Examples of the sulfur-based antioxidants include dodecanethiol, dilauryl-3,3'-thiodipropionate, dimyristyl-3,3'-thiodipropionate, and distearyl-3,3'-thiodipropionate.

Among these, the antioxidant preferably includes a phosphorous-based antioxidant, and more preferably includes a phosphite-based antioxidant from the viewpoint of further improving the heat resistance of the cured product.

In a case where the curable epoxy composition includes an antioxidant, the content (blending amount) of the antioxidant in the curable epoxy composition is not particularly limited, but is preferably from 0.1 to 5 parts by mass and more preferably from 0.5 to 3 parts by mass with respect to 100 parts by mass of the total epoxy compound content of the curable epoxy composition. If the content of the antioxidant is 0.1 parts by mass or greater, the cured product is efficiently prevented from oxidation, and tends to have heat resistance and yellowing resistance that are further improved. If the content of the antioxidant is 5 parts by mass or less, discoloration is suppressed, and a cured product having further good hue tends to be easily obtained.

The curable epoxy composition can be, but is not particularly limited to, one prepared by stirring and mixing the above-described components under heating as necessary. The curable epoxy composition can be used as a one-part composition, which contains components mixed beforehand and is used as is, or alternatively, used as a multi-part (for example, two-part) composition of which two or more components having been separately stored are mixed for use before use. The stirring and mixing method is not particularly limited, and a well-known or commonly used stirring and mixing unit can be used, for example, including a mixer of various types, such as a dissolver and a homogenizer; a kneader; a roll mill; a bead mill; and a rotation/revolution stirring apparatus. In addition, after the stirring and mixing, the mixture may be defoamed under vacuum.

Cured Product

By curing the curable epoxy composition, a cured product having excellent heat resistance can be obtained. As a method of curing, a well-known or commonly used method such as heat treatment can be used. The temperature during curing by heating (curing temperature) is not particularly limited, but is preferably from 45 to 200° C., more preferably from 50 to 190° C., and still more preferably from 55 to 180° C. The heating time (curing time) during curing is not particularly limited, but is preferably from 30 to 600 minutes, more preferably from 45 to 540 minutes, and still more preferably from 60 to 480 minutes. If the curing temperature and the curing time are 45° C. or higher, curing is sufficient, and if the curing temperature is 200° C. or lower, decomposition of the resin component can be suppressed. Although the curing conditions depend on various conditions, the curing conditions can be appropriately adjusted, for example, by shortening the curing time when the curing temperature is increased, or increasing the curing time when the curing temperature is reduced. The curing can be performed in one step or in multiple steps of two or more steps.

The cured product preferably has a glass transition temperature (Tg) of 180° C. or higher, more preferably 190° C. or higher, still more preferably 200° C. or higher, and particularly preferably 210° C. or higher. If the glass transition temperature is 180° C. or higher, the heat resistance is excellent even in the case of an environment of a temperature of 180° C. or higher, such as the operating environment temperature of an EV motor. The glass transition temperature of the cured product is a value measured with a DSC (differential scanning calorimeter).

The cured product preferably has a bending strain at 23° C. of 2.0% or greater, more preferably 3.0% or greater, still more preferably 4.0% or greater, and particularly preferably 4.3% or greater. If the bending strain is 2.0% or greater (in particular, 4.0% or greater), the flexibility in an ordinary temperature environment is improved to achieve excellent toughness. The bending strain at 23° C. can be measured in accordance with JIS K 7171 (2008).

The cured product preferably has a bending strain at 150° C. of 2.0% or greater, more preferably 4.4% or greater, still more preferably 5.0% or greater, and particularly preferably 5.4% or greater. If the bending strain is 2.0% or greater (in particular, 4.4% or greater), excellent flexibility and excellent toughness are achieved even in the case of an environment of a temperature of 180° C. or higher, such as the operating environment temperature of an EV motor. The bending strain at 150° C. can be measured in accordance with JIS K 7171 (2008).

The curable epoxy composition and the cured product are used in a part included in a rotary electric machine (for a rotary electric machine). The cured product has excellent heat resistance, and therefore can be preferably used in a part used in a high heat environment, in particular in an automobile part (for example, for an automobile EV motor). Specific usage aspects of the cured product include insulating materials, coating materials, and adhesives. The curing agent composition including the acid anhydride-based curing agent (B) and the imidazole-based curing accelerator (C) has a long shelf life and is less likely to thicken during storage, and therefore the curable epoxy composition obtained by mixing the curing agent composition and the epoxy compound (A) has excellent wettability and an excellent impregnation property to an object to which the curable epoxy composition is to be applied. Therefore, the curable epoxy composition can be preferably used in processes such as atmospheric pressure impregnation, vacuum impregnation, pressure impregnation, and dipping.

The curable epoxy composition and the cured product are used in a rotary electric machine as described above, for example, for protecting a rotor wire (for covering a winding, a winding tip, and the like), for impregnating/casting a stator coil, for impregnating/casting and covering the entire stator, for fixing a magnet in a rotor and/or a stator to fix a magnet inserted into a hole provided in a rotor core or a stator core to an inner wall of the hole, and for filling a gap between the hole and the magnet.

In particular, the curable epoxy composition and the cured product are preferably used for impregnating a coil to impregnate/cast a coil (wire, winding) in a stator or a rotor of a rotary electric machine.

By using the cured product in the rotary electric machine, a rotary electric machine can be obtained that includes the cured product in a form such as a rotor for a rotary electric machine including the cured product covering a winding of the rotor; a stator for a rotary electric machine including the cured product that is formed to cover a stator coil; a stator for a rotary electric machine including the cured product covering the entire stator; a rotor or a stator for a rotary electric machine including a rotor core or a stator core having a hole, a magnet inserted into the hole, and the cured product adhering the magnet to an inner wall of the hole; or a rotor or a stator for a rotary electric machine including a rotor core or a stator core having a hole, a magnet inserted into the hole, the cured product with which a gap between the magnet and an inner wall of the hole is filled.

Each aspect disclosed in the present specification can be combined with any other feature disclosed herein. Note that each of the configurations, combinations thereof, or the like in each of the embodiments are examples, and additions, omissions, replacements, and other changes to the configurations may be made as appropriate without departing from the spirit of the present disclosure. In addition, each aspect of the invention according to the present disclosure is not limited by the embodiments or the following examples but is limited only by the claims.

EXAMPLES

An embodiment of the present invention will be described in further detail below based on examples.

Example 1

Preparation of Curable Epoxy Composition

Methylnadic anhydride as a curing agent and 1-methylimidazole as a curing accelerator were uniformly mixed in a blending proportion (unit: parts by mass) shown in Table 1 using a rotation/revolution stirring apparatus (trade name "THINKY MIXER AR-250", available from THINKY CORPORATION), and the mixture was defoamed to obtain an epoxy curing agent.

Next, an alicyclic epoxy compound (trade name "Celloxide 2021P", available from Daicel Corporation) and the epoxy curing agent were uniformly mixed in a blending proportion (unit: part by mass) shown in Table 1 using a rotation/revolution stirring apparatus (trade name "THINKY MIXER AR-250", available from THINKY CORPORATION), and the mixture was defoamed to prepare a curable epoxy composition.

Preparation of Cured Product

The curable epoxy composition obtained above was packed in a mold, and heated at 80° C. for 1 hour, at 130° C. for 1 hour, and at 180° C. for 1 hour continuously using an oven and thus cured to prepare a cured product.

Examples 2 to 34 and Comparative Examples 1 and 2

A curable epoxy composition and a cured product were prepared in the same manner as in Example 1 except for changing the composition of the curable epoxy composition to the composition shown in Table 1. In some of Examples and Comparative Examples, a polyester polyol was blended as a constituent component of the curable epoxy composition. In a case where a polyester polyol was blended, an alicyclic epoxy compound (trade name "Celloxide 2021P", available from Daicel Corporation), a polyester polyol, and the epoxy curing agent were uniformly mixed using a rotation/revolution stirring apparatus (trade name "THINKY MIXER AR-250", available from THINKY CORPORATION), and the mixture was defoamed to prepare a curable epoxy composition.

Evaluation

The curable epoxy compositions and the cured products obtained in Examples and Comparative Examples were subjected to the following evaluation tests.

Viscosity at 25° C.

The viscosity of each curable epoxy composition at 25° C. were measured using a digital viscometer (model No. "DVU-EII", available from TOKIMEC INC.) under conditions: rotor: standard 1° 34'×R24; temperature: 25° C.; rotation speed: from 0.5 to 10 rpm.

Glass Transition Temperature

The glass transition temperature of each cured product was measured using a differential scanning calorimeter (trade name "Q2000", available from TA Instruments Inc.) as follows. A pretreatment was implemented (in which the temperature was increased from 30° C. to 250° C. at a temperature increase rate of 10° C./min, and then decreased from 250° C. to 30° C. at a temperature decrease rate of −10° C./min), and then the glass transition temperature was measured in a nitrogen stream in a measurement temperature range of from 30 to 250° C. at a temperature increase rate of 10° C./min. The temperature at the inflection point of the obtained temperature thermal history curve was then determined as the glass transition temperature.

Bending Strain

The bending strain of each cured product was measured in accordance with JIS K 7171 (2008).

TABLE 1

| | | | Examples | | | | | | | | |
|---|---|---|---|---|---|---|---|---|---|---|---|
| | | | 1 | 2 | 3 | 4 | 5 | 6 | 7 | 8 | 9 |
| Curable composition | Alicyclic epoxy compound (A) | Celloxide 2021P | 100.0 | 80.0 | 80.0 | 80.0 | 80.0 | 80.0 | 80.0 | 80.0 | 100.0 |
| | Polyester polyol (D) | PCL220EB | — | 20.0 | — | — | — | — | — | — | — |
| | | PCL305 | — | — | 20.0 | — | — | — | — | — | — |
| | | PCL303 | — | — | — | 20.0 | — | — | — | — | — |
| | | PCL205U | — | — | — | — | 20.0 | — | — | — | — |
| | | L220AL | — | — | — | — | — | 20.0 | — | — | — |
| | | L320AL | — | — | — | — | — | — | 20.0 | — | — |
| | | Kuraray polyol P-2010 | — | — | — | — | — | — | — | 20.0 | — |
| | Acid anhydride-based curing agent (B) | NMA | 123.0 | 99.0 | 99.0 | 99.0 | 99.0 | 99.0 | 99.0 | 99.0 | — |
| | | HHPA7030NC | — | — | — | — | — | — | — | — | 115.0 |
| | | ECA100 | — | — | — | — | — | — | — | — | — |
| | | HN-5500N | — | — | — | — | — | — | — | — | — |
| | Imidazole-based curing accelerator (C) | 1-MI | 0.3 | 0.3 | 0.3 | 0.3 | 0.3 | 0.3 | 0.3 | 0.3 | 0.3 |
| | | 2-MI | — | — | — | — | — | — | — | — | — |
| | | 2E4MZ | — | — | — | — | — | — | — | — | — |
| | Another curing accelerator | Dimethyl-benzylamine | — | — | — | — | — | — | — | — | — |
| | | PX-4ET | — | — | — | — | — | — | — | — | — |
| Property | | Viscosity [mPa · s] | 530.0 | 902.0 | 742.0 | 699.0 | 483.3 | 834.0 | 858.0 | 801.0 | 217.8 |
| Physical properties of cured product | | Glass transition temperature [° C.] | 227.3 | 211.8 | 210.4 | 210.7 | 211.2 | 208.5 | 207.4 | 203.3 | 225.2 |
| | | Bending strain (23° C.) [%] | 3.0 | 4.4 | 4.2 | 4.1 | 4.0 | 4.2 | 4.2 | 4.9 | 4.4 |
| | | Bending strain (150° C.) [%] | 4.9 | 5.5 | 5.6 | 5.3 | 5.2 | 5.5 | 5.1 | 5.9 | 4.9 |

| | | | Examples | | | | | Comparative Examples | |
|---|---|---|---|---|---|---|---|---|---|
| | | | 10 | 11 | 12 | 13 | 14 | 1 | 2 |
| Curable composition | Alicyclic epoxy compound (A) | Celloxide 2021P | 80.0 | 100.0 | 80.0 | 100.0 | 100.0 | 90.0 | 80.0 |
| | Polyester polyol (D) | PCL220EB | 20.0 | — | 20.0 | — | — | — | 20.0 |
| | | PCL305 | — | — | — | — | — | — | — |
| | | PCL303 | — | — | — | — | — | 10.0 | — |
| | | PCL205U | — | — | — | — | — | — | — |
| | | L220AL | — | — | — | — | — | — | — |
| | | L320AL | — | — | — | — | — | — | — |
| | | Kuraray polyol P-2010 | — | — | — | — | — | — | — |
| | Acid anhydride-based curing agent (B) | NMA | — | 59.5 | 77.6 | 123.0 | 123.0 | — | 99.0 |
| | | HHPA7030NC | 92.0 | — | — | — | — | — | — |
| | | ECA100 | — | 59.5 | 19.4 | — | — | — | — |
| | | HN-5500N | — | — | — | — | — | 100.0 | — |
| | Imidazole-based curing accelerator (C) | 1-MI | 0.3 | 0.3 | 0.3 | — | — | — | — |
| | | 2-MI | — | — | — | 0.3 | — | — | — |
| | | 2E4MZ | — | — | — | — | 0.3 | — | — |

TABLE 1-continued

|  |  |  |  |  |  |  |  |  |  |
|---|---|---|---|---|---|---|---|---|---|
|  | Another curing accelerator | Dimethyl-benzylamine | — | — | — | — | — | — | 6.0 |
|  |  | PX-4ET | — | — | — | — | — | 1.0 | — |
| Property | Viscosity [mPa · s] |  | 437.0 | 353.1 | 876.0 | 515.0 | 526.0 | 322.3 | 769.0 |
| Physical properties of cured product | Glass transition temperature [° C.] |  | 197.5 | 214.3 | 208.2 | 221.0 | 212.5 | 176.0 | 174.8 |
|  | Bending strain (23° C.) [%] |  | 4.9 | 3.5 | 4.9 | 3.3 | 2.9 | 3.6 | 3.8 |
|  | Bending strain (150° C.) [%] |  | 6.4 | 5.4 | 6.2 | 4.6 | 5.0 | 4.3 | 3.9 |

TABLE 2

|  |  |  | Examples |  |  |  |  |  |  |  |  |  |  |
|---|---|---|---|---|---|---|---|---|---|---|---|---|---|
|  |  |  | 15 | 16 | 17 | 18 | 19 | 20 | 21 | 22 | 23 | 24 | 25 |
| Curable composition | Alicyclic epoxy compound (A) | Celloxide 2021P | 100.0 | 80.0 | 80.0 | 80.0 | 80.0 | 80.0 | 80.0 | 80.0 | 100.0 | 80.0 | 100.0 |
|  | Polyester polyol (D) | PCL220EB | — | 20.0 | — | — | — | — | — | — | — | 20.0 | — |
|  |  | PCL305 | — | — | 20.0 | — | — | — | — | — | — | — | — |
|  |  | PCL303 | — | — | — | 20.0 | — | — | — | — | — | — | — |
|  |  | PCL205U | — | — | — | — | 20.0 | — | — | — | — | — | — |
|  |  | L220AL | — | — | — | — | — | 20.0 | — | — | — | — | — |
|  |  | L320AL | — | — | — | — | — | — | 20.0 | — | — | — | — |
|  |  | Kuraray polyol P-2010 | — | — | — | — | — | — | — | 20.0 | — | — | — |
|  | Acid anhydride-based curing agent (B) | NMA | 123.0 | 99.0 | 99.0 | 99.0 | 99.0 | 99.0 | 99.0 | 99.0 | — | — | 59.5 |
|  |  | HHPA7030NC | — | — | — | — | — | — | — | — | 115.0 | 92.0 | — |
|  |  | ECA100 | — | — | — | — | — | — | — | — | — | — | 59.5 |
|  |  | HN-5500N | — | — | — | — | — | — | — | — | — | — | — |
|  | Imidazole-based curing accelerator (C) | 1-MI | — | — | — | — | — | — | — | — | — | — | — |
|  |  | HPI | 0.3 | 0.3 | 0.3 | 0.3 | 0.3 | 0.3 | 0.3 | 0.3 | 0.3 | 0.3 | 0.3 |
|  |  | LC-80 | — | — | — | — | — | — | — | — | — | — | — |
|  | Inorganic filler (E) | R202 | — | — | — | — | — | — | — | — | — | — | — |
|  |  | TS-720 | — | — | — | — | — | — | — | — | — | — | — |
|  | Additive | BYK378 | — | — | — | — | — | — | — | — | — | — | — |
|  |  | BYK506 | — | — | — | — | — | — | — | — | — | — | — |
|  |  | BYK525 | — | — | — | — | — | — | — | — | — | — | — |
| Property | Viscosity [mPa · s] |  | 542 | 901 | 740 | 695 | 481 | 832 | 855 | 799 | 213 | 433 | 351 |
| Physical properties of cured product | Glass transition temperature [° C.] |  | 231 | 214 | 212 | 213 | 223 | 209 | 208 | 206 | 226 | 199 | 215 |

|  |  |  | Examples |  |  |  |  |  |  |  |  |
|---|---|---|---|---|---|---|---|---|---|---|---|
|  |  |  | 26 | 27 | 28 | 29 | 30 | 31 | 32 | 33 | 34 |
| Curable composition | Alicyclic epoxy compound (A) | Celloxide 2021P | 100.0 | 100.0 | 80.0 | 80.0 | 100.0 | 100.0 | 80.0 | 100.0 | 100.0 |
|  | Polyester polyol (D) | PCL220EB | — | — | 20.0 | — | — | — | 20.0 | — | — |
|  |  | PCL305 | — | — | — | 20.0 | — | — | — | — | — |
|  |  | PCL303 | — | — | — | — | — | — | — | — | — |
|  |  | PCL205U | — | — | — | — | — | — | — | — | — |
|  |  | L220AL | — | — | — | — | — | — | — | — | — |
|  |  | L320AL | — | — | — | — | — | — | — | — | — |
|  |  | Kuraray polyol P-2010 | — | — | — | — | — | — | — | — | — |
|  | Acid anhydride-based curing agent (B) | NMA | 77.6 | 123.0 | 99.0 | 99.0 | 123.0 | 123.0 | 99.0 | 123.0 | 123.0 |
|  |  | HHPA7030NC | — | — | — | — | — | — | — | — | — |
|  |  | ECA100 | 19.4 | — | — | — | — | — | — | — | — |
|  |  | HN-5500N | — | — | — | — | — | — | — | — | — |
|  | Imidazole-based curing accelerator (C) | 1-MI | — | — | — | — | — | — | 0.3 | 0.3 | 0.3 | 0.3 |
|  |  | HPI | 0.3 | — | — | — | — | — | — | — | — |
|  |  | LC-80 | — | 5.0 | 5.0 | 5.0 | 5.0 | — | — | — | — |
|  | Inorganic filler (E) | R202 | — | 2.3 | 2.3 | 2.3 | — | — | — | — | — |
|  |  | TS-720 | — | — | — | — | — | 2.3 | — | — | — |
|  | Additive | BYK378 | — | — | — | — | — | — | 0.5 | 0.5 | — | — |
|  |  | BYK506 | — | — | — | — | — | — | — | — | 0.5 | — |
|  |  | BYK525 | — | — | — | — | — | — | — | — | — | 0.5 |
| Property | Viscosity [mPa · s] |  | 873 | 2360 | 3276 | 3525 | 2420 | 500 | 879 | 511 | 516 |
| Physical properties of cured product | Glass transition temperature [° C.] |  | 210 | 235 | 232 | 224 | 230 | 225 | 211 | 226 | 224 |

As can be seen from Tables 1 and 2, the cured product of the curable epoxy composition including the alicyclic epoxy compound, the acid anhydride-based curing agent, and the imidazole-based curing accelerator has a high glass transition temperature of 180° C. or higher (Examples 1 to 34), and it is inferred that the cured product has excellent heat resistance even in a high temperature environment. In cases another curing accelerator is used instead of the imidazole-based curing accelerator (Comparative Examples 1 and 2), the glass transition temperature of the cured product is as low as lower than 180° C., and it is inferred that the cured product has poor heat resistance. In cases a polyester polyol is included (Examples 2 to 8, 10, and 12), the cured product has a glass transition temperature of 180° C. or higher and has high bending strain, and it is inferred that the cured product has excellent heat resistance even in a high temperature environment and is excellent in flexibility and toughness. Furthermore, the curable epoxy composition in Examples is liquid at 25° C., and is also excellent in an impregnation property.

Example 35

Methylnadic anhydride as the acid anhydride-based curing agent (B), the imidazole-based curing accelerator (C), and as necessary, another additive was uniformly mixed in a blending proportion (unit: part by mass) shown in Table 3 to prepare an epoxy curing agent composition. The obtained epoxy curing agent composition was left at 60° C., and at this point in time, the viscosity was measured, and from this point, the time for which the viscosity reached twice the initial viscosity was measured to determine the shelf life. As a result, the shelf life in a case where LC-80 was used (II and III), the shelf life in a case where HPI was used (I), and the shelf life in a case where 1-MI was used (IV) decreased in this order.

TABLE 3

| | | | Example 35 | | | |
|---|---|---|---|---|---|---|
| | | | I | II | III | IV |
| | Acid anhydride-based curing agent (B) | NMA | 100.0 | 100.0 | 100.0 | 100.0 |
| | Imidazole-based curing accelerator (C) | 1-MI | — | — | — | 0.8 |
| | | HPI | 0.8 | — | — | — |
| | | LC-80 | — | 5.0 | 5.0 | — |
| | Additive | R202 | — | 2.3 | — | — |
| | | TS-720 | — | — | 2.3 | — |
| Property | Shelf life [day] | | 60 | >180 | >180 | 47 |

The components that were used in Examples and Comparative Examples are as follows:

Alicyclic Epoxy Compound

Celloxide 2021P: Trade name "Celloxide 2021P" (3,4-epoxycyclohexylmethyl(3,4-epoxy)cyclohexanecarboxylate, available from Daicel Corporation Acid Anhydride Curing Agent NMA: Trade name "NMA", available from Dixie Chemical, methylnadic anhydride HHPA7030 NC: Trade name "HHPA 7030 NC", available from Dixie Chemical, mixture of hexahydrophthalic anhydride and methylhexahydrophthalic anhydride ECA100: Trade name "ECA 100", available from Dixie Chemical, mixture of methyltetrahydrophthalic anhydride and tetrahydrophthalic anhydride HN-5500N: Trade name "HN-5500N", available from Hitachi Chemical Co., Ltd., methylhexahydrophthalic anhydride (Polyester Polyol)

PCL220EB: Trade name "PLACCEL 220EB", available from Daicel Corporation, aliphatic polyester diol, molecular weight: 2000, hydroxyl value: 56.8 KOH mg/g PCL305: Trade name "PLACCEL 305", available from Daicel Corporation, polycaprolactone triol, molecular weight: 550, hydroxyl value:
305.6 KOH mg/g PCL303: Trade name "PLACCEL 303", available from Daicel Corporation, polycaprolactone triol, molecular weight: 310, hydroxyl value: 541.3 KOH mg/g PCL205U: Trade name "PLACCEL 205U", available from Daicel Corporation, polycaprolactone diol, molecular weight: 530, hydroxyl value: 211.9 KOH mg/g L220AL: Trade name "PLACCEL L220AL", available from Daicel Corporation, aliphatic polyester diol, molecular weight: 2000, hydroxyl value: 56.8 KOH mg/g L320AL: Trade name "PLACCEL L320AL", available from Daicel Corporation, aliphatic polyester triol, molecular weight: 200, hydroxyl value: 83.4 KOH mg/g Kuraray polyol P-2010: Trade name "Kuraray polyol P-2010", aliphatic polyester diol, available from Kuraray Co., Ltd., molecular weight 2000

Curing Accelerator

1-MI: 1-methylimidazole
2-MI: 2-methylimidazole
2E4MZ: 2-ethyl-4-methylimidazole
HPI: 1-(2-hydroxypropyl)imidazole LC-80: Trade name "Technicure LC-80", available from A & C Catalysts, amine adduct of 2-methylimidazole and bisphenol A type epoxy compound, latent curing accelerator PX-4ET: Trade name "PX-4ET", tetrabutylphosphonium diethyl phosphodithionate, available from NIPPON CHEMICAL INDUSTRIAL CO., LTD.

Additive

R202: Trade name "AEROSIL R202", available from Evonik Industries AG, fumed silica TS-720: Trade name "CAB-O-SIL TS-720", available from Cabot Corporation, fumed silica BYK378: Trade name "BYK-378", available from BYK Japan KK BYK506: Trade name "BYK-A 506", available from BYK Japan KK BYK525: Trade name "BYK-A 525", available from BYK Japan KK Hereinafter, variations of the invention according to the present disclosure will be described.

[Appendix 1] A curable epoxy composition for a rotary electric machine, including an alicyclic epoxy compound (A) having an alicyclic structure and an epoxy group in a molecule, an acid anhydride-based curing agent (B), and an imidazole-based curing accelerator (C), in which the curable epoxy resin is liquid at 25° C.

[Appendix 2] The curable epoxy composition for a rotary electric machine according to Appendix 1, including a polyester polyol (D).

[Appendix 3] A curable epoxy composition for a rotary electric machine, including an alicyclic epoxy compound (A) having an alicyclic structure and an epoxy group in a molecule, an acid anhydride-based curing agent (B), an imidazole-based curing accelerator (C), and a polyester polyol (D).

[Appendix 4] The curable epoxy composition for a rotary electric machine according to Appendix 2 or 3, in which the polyester polyol (D) includes a polyester polyol having a molecular weight of 250 or greater (preferably 600 or greater, more preferably 1100 or more, and still more preferably 1700 or greater).

[Appendix 5] The curable epoxy composition for a rotary electric machine according to any one of Appendixes 2 to 4, in which the polyester polyol (D) includes a polyester polyol having a molecular weight of 100000 or less (50000 or less, 10000 or less, or 4000 or less).

[Appendix 6] The curable epoxy composition for a rotary electric machine according to any one of Appendixes 2 to 5, in which the polyester polyol (D) includes a polyester polyol having a hydroxyl value of 600 KOH mg/g or less (preferably 200 KOH mg/g or less, more preferably 100 KOH mg/g or less, and still more preferably 80 KOH mg/g or less).

[Appendix 7] The curable epoxy composition for a rotary electric machine according to any one of Appendixes 2 to 6, in which the polyester polyol (D) includes a polyester polyol having a molecular weight of 600 or greater and a hydroxyl value of 200 KOH mg/g or less.

[Appendix 8] The curable epoxy composition for a rotary electric machine according to any one of Appendixes 2 to 7, in which the polyester polyol (D) includes a polylactone polyol and/or an aliphatic polyester polyol.

[Appendix 9] The curable epoxy composition for a rotary electric machine according to any one of Appendixes 2 to 8, in which a proportion of a content of the polyester polyol (D) in the curable epoxy composition is from 1 to 30 mass % (preferably from 3 to 20 mass %, and more preferably from 5 to 15 mass %) with respect to a total amount of the curable epoxy composition.

[Appendix 10] The curable epoxy composition for a rotary electric machine according to any one of Appendixes 2 to 9, in which a proportion of the polyester polyol (D) in the curable epoxy composition is from 5 to 45 mass % (preferably from 10 to 35 mass %, and more preferably from 15 to 30 mass %) with respect to a total curable compound content of the curable epoxy composition.

[Appendix 11] The curable epoxy composition for a rotary electric machine according to any one of Appendixes 1 to 10, in which a proportion of a content of the alicyclic epoxy compound (A) in an epoxy compound content of the curable epoxy composition is more than 70 mass % (75 mass % or greater, 80 mass % or greater, 85 mass % or greater, 90 mass % or greater, 95 mass % or greater, or 99 mass % or greater).

[Appendix 12] The curable epoxy composition for a rotary electric machine according to any one of Appendixes 1 to 11, in which a proportion of a content of the acid anhydride-based curing agent (B) in a curing agent content of the curable epoxy composition is more than 80 mass % (85 mass % or greater, 90 mass % or greater, 95 mass % or greater, or 99 mass % or greater).

[Appendix 13] The curable epoxy composition for a rotary electric machine according to any one of Appendixes 1 to 12, including an inorganic filler (E).

[Appendix 14] The curable epoxy composition for a rotary electric machine according to Appendix 13, in which a content of the inorganic filler (E) is from 0.5 to 500 parts by mass with respect to 100 parts by mass of a total curable compound content in the curable epoxy composition.

[Appendix 15] The curable epoxy composition for a rotary electric machine according to Appendix 13, in which the content of the inorganic filler (E) is from 0.5 to 50 parts by mass (preferably from 1 to 10 parts by mass) with respect to 100 parts by mass of a total curable compound content in the curable epoxy composition.

[Appendix 16] The curable epoxy composition for a rotary electric machine according to Appendix 13, in which the content of the inorganic filler (E) is 100 parts by mass or greater (for example, from 100 to 500 parts by mass) (more preferably 250 parts by mass or greater (for example, from 250 to 400 parts by mass)) with respect to 100 parts by mass of a total curable compound content in the curable epoxy composition.

[Appendix 17] The curable epoxy composition for a rotary electric machine according to Appendix 13, in which a proportion of a content of the inorganic filler (E) is from 0.3 to 90 mass % with respect to a total amount of the curable epoxy composition.

[Appendix 18] The curable epoxy composition for a rotary electric machine according to Appendix 13, in which the proportion of the content of the inorganic filler (E) is from 0.3 to 8 mass % (preferably from 0.5 to 3 mass %) with respect to a total amount of the curable epoxy composition.

[Appendix 19] The curable epoxy composition for a rotary electric machine according to Appendix 13, in which the proportion of the content of the inorganic filler (E) is 50 mass % or greater (for example, from 50 to 90 mass %) (more preferably 55 mass % or greater (for example, from 55 to 80 mass %)) with respect to a total amount of the curable epoxy composition.

[Appendix 20] The curable epoxy composition for a rotary electric machine according to any one of Appendixes 13 to 19, in which the inorganic filler (E) includes silica (preferably, hydrophobic silica).

[Appendix 21] The curable epoxy composition for a rotary electric machine according to Appendix 20, in which the silica has a specific surface area of 10 $m^2$/g or greater (preferably 40 $m^2$/g or greater, and more preferably 70 $m^2$/g or greater).

[Appendix 22] The curable epoxy composition for a rotary electric machine according to Appendix 20 or 21, in which the silica has a median particle size of 200 nm or less (preferably 100 nm or less, and more preferably 50 nm or less).

[Appendix 23] The curable epoxy composition for a rotary electric machine according to any one of Appendixes 20 to 22, in which the silica has a median particle size of from 0.1 to 50 μm (preferably from 0.1 to 30 μm).

[Appendix 24] The curable epoxy composition for a rotary electric machine according to any one of Appendixes 1 to 23, having a viscosity of 330 mPa·s or greater (for example, from 330 to 100000 mPa·s) at 25° C.

[Appendix 25] The curable epoxy composition for a rotary electric machine according to any one of Appendixes 1 to 23, having a viscosity of 400 mPa·s or greater (for example, from 400 to 10000 mPa·s) (preferably 450 mPa·s or greater (for example, from 450 to 1000 mPa·s)) at 25° C.

[Appendix 26] The curable epoxy composition for a rotary electric machine according to any one of Appendixes 1 to 23, having a viscosity of 8000 mPa·s or greater (for example, from 8000 to 100000 mPa·s) (preferably 10000 mPa·s or greater (for example, from 10000 to 70000 mPa·s)) at 25° C.

[Appendix 27] The curable epoxy composition for a rotary electric machine according to any one of Appendixes 1 to 26, in which the acid anhydride-based curing agent (B) includes nadic anhydride or its derivative, such as nadic anhydride, methylnadic anhydride, or hydrogenated methylnadic anhydride (preferably methylnadic anhydride).

[Appendix 28] The curable epoxy composition for a rotary electric machine according to any one of Appendixes 1 to 27, in which the imidazole-based curing accelerator (C) includes one or more selected from the group consisting of 1-methylimidazole, 2-methylimidazole, 1-(2-hydroxypropyl)imidazole, an amine adduct of 1-methylimidazole, 2-methylimidazole, or 1-(2-hydroxypropyl)imidazole (preferably an amine adduct with an epoxy compound, more preferably an amine adduct with a bisphenol-type epoxy compound, and still more preferably an amine adduct with a bisphenol A type epoxy compound), and a latent curing accelerator containing one or more of 1-methylimidazole, 2-methylimidazole, 1-(2-hydroxypropyl)imidazole, and the amine adduct.

[Appendix 29] The curable epoxy composition for a rotary electric machine according to any one of Appendixes 1 to 28, including a polyhydric alcohol (preferably one or more polyhydric alcohols selected from the group consisting of ethylene glycol, diethylene glycol, propylene glycol, and glycerin) other than the polyester polyol (D).

[Appendix 30] The curable epoxy composition for a rotary electric machine according to any one of Appendixes 1 to 29, in which a total proportion of the alicyclic epoxy compound (A) and the polyester polyol (D) in the curable compounds contained in the curable epoxy composition (in a case where the polyester polyol (D) is not contained, the proportion of the alicyclic epoxy compound (A)) is 50 mass % or greater (preferably 60 mass % or greater, more preferably 70 mass % or greater, even more preferably 80 mass % or greater, yet even more preferably 90 mass % or greater, and particularly preferably 95 mass % or greater).

[Appendix 31] The curable epoxy composition for a rotary electric machine according to any one of Appendixes 1 to 30, in which a content of the acid anhydride-based curing agent (B) in the curable epoxy composition is from 50 to 200 parts by mass (preferably from 80 to 150 parts by mass) with respect to 100 parts by mass of a total amount of compounds having an epoxy group contained in the curable epoxy composition.

[Appendix 32] The curable epoxy composition for a rotary electric machine according to any one of Appendixes 1 to 31, in which a proportion of a content of the acid anhydride-based curing agent (B) in the curable epoxy composition is from 0.5 to 1.5 equivalents (preferably from 0.8 to 1.1 equivalents, and more preferably 0.9 equivalents or greater and less than 1.0 equivalent) per equivalent of epoxy groups in all the compounds having an epoxy group contained in the curable epoxy composition.

[Appendix 33] The curable epoxy composition for a rotary electric machine according to any one of Appendixes 1 to 32, in which a content of the imidazole-based curing accelerator (C) in the curable epoxy composition is from 0.01 to 5 parts by mass (preferably from 0.03 to 3 parts by mass, and more preferably from 0.1 to 2 parts by mass) with respect to 100 parts by mass of the total curable compound content in the curable epoxy composition.

[Appendix 34] The curable epoxy composition for a rotary electric machine according to any one of Appendixes 1 to 33, in which a proportion of the imidazole-based curing accelerator (C) in a curing accelerator content of the curable epoxy composition is 50 mass % or greater (60 mass % or greater, 75 mass % or greater, 90 mass % or greater, 95 mass % or greater, or 99 mass % or greater) with respect to a total curing accelerator amount.

[Appendix 35] The curable epoxy composition for a rotary electric machine according to any one of Appendixes 1 to 34, in which a proportion of the alicyclic epoxy compound (A) in the curable epoxy composition is 50 mass % or greater (60 mass % or greater, 70 mass % or greater, or 75 mass % or greater) with respect to the total curable compound content of the curable epoxy composition.

[Appendix 36] The curable epoxy composition for a rotary electric machine according to any one of Appendixes 1 to 35, including an antioxidant (preferably one or more antioxidants selected from the group consisting of phenol-based antioxidants, hindered amine-based antioxidants, phosphorous-based antioxidants, and sulfur-based antioxidants, more preferably a phosphorous-based antioxidant, and still more preferably a phosphite-based antioxidant).

[Appendix 37] The curable epoxy composition for a rotary electric machine according to Appendix 36, in which an antioxidant content of the curable epoxy composition is from 0.1 to 5 parts by mass (preferably from 0.5 to 3 parts by mass) with respect to 100 parts by mass of the total epoxy compound content in the curable epoxy composition.

[Appendix 38] The curable epoxy composition for a rotary electric machine according to any one of Appendixes 1 to 37, to be used for impregnating a stator coil of the rotary electric machine or used for fixing a magnet to fix a magnet inserted into a hole provided in a rotor core of the rotary electric machine to an inner wall of the hole.

[Appendix 39] A cured product of the curable epoxy composition for a rotary electric machine according to any one of Appendixes 1 to 38.

[Appendix 40] The cured product according to Appendix 39, having a glass transition temperature of 180° C. or higher (preferably 190° C. or higher, more preferably 200° C. or higher, and still more preferably 210° C. or higher).

[Appendix 41] The cured product according to Appendix 39 or 40, having a bending strain at 150° C. of 2.0% or greater (preferably 4.4% or greater, more preferably 5.0% or greater, and still more preferably 5.4% or greater).

[Appendix 42] The cured product according to any one of Appendixes 39 to 41, having a bending strain at 23° C. of 2.0% or greater (preferably 3.0% or greater, more preferably 4.0% or greater, and still more preferably 4.3% or greater).

[Appendix 43] A stator for a rotary electric machine, including the cured product according to any one of Appendixes 39 to 42, the cured produce being formed to cover a stator coil.

[Appendix 44] A rotor for a rotary electric machine, including the cured product according to any one of Appendixes 39 to 42 that covers a winding of the rotor.

The invention claimed is:

1. A curable epoxy composition for a rotary electric machine, the curable epoxy composition comprising:
   an alicyclic epoxy compound (A) having an alicyclic structure and an epoxy group in a molecule;
   an acid anhydride-based curing agent (B);
   an imidazole-based curing accelerator (C); and
   a polyester polyol (D) comprising one or more polyester polyols selected from the group consisting of polylactone polyols, aliphatic polyester polyols, and alicyclic polyester polyols;
   wherein a proportion of a content of the imidazole-based curing accelerator (C) in a curing accelerator content of the curable epoxy composition is 50% by mass or greater; and
   wherein when the curable epoxy composition is cured into a cured product, a glass transition temperature of the cured product is 200° C. or higher.

2. The curable epoxy composition for a rotary electric machine according to claim 1, wherein the polyester polyol (D) comprises a polyester polyol having a molecular weight of 600 or greater and a hydroxyl value of 200 KOH mg/g or less.

3. The curable epoxy composition for a rotary electric machine according to claim 1, wherein a proportion of a content of the alicyclic epoxy compound (A) in an epoxy compound content of the curable epoxy composition is more than 70 mass %.

4. The curable epoxy composition for a rotary electric machine according to claim 1, wherein a proportion of a content of the acid anhydride-based curing agent (B) in a curing agent content of the curable epoxy composition is more than 80 mass %.

5. The curable epoxy composition for a rotary electric machine according to claim 1, wherein the curable epoxy composition further comprises an inorganic filler (E).

6. The curable epoxy composition for a rotary electric machine according to claim 5, wherein a content of the inorganic filler (E) is from 0.5 to 50 parts by mass with respect to 100 parts by mass of a total curable compound content in the curable epoxy composition.

7. The curable epoxy composition for a rotary electric machine according to claim 5, wherein a content of the inorganic filler (E) is 100 parts by mass or greater with respect to 100 parts by mass of a total curable compound content in the curable epoxy composition.

8. The curable epoxy composition for a rotary electric machine according to claim 1, having a viscosity of 330 mPa·s or greater at 25° C.

9. The curable epoxy composition for a rotary electric machine according to claim 1, wherein the acid anhydride-based curing agent (B) comprises methylnadic anhydride.

10. The curable epoxy composition for a rotary electric machine according to claim 1, wherein the imidazole-based curing accelerator (C) comprises one or more selected from the group consisting of: 1-methylimidazole, 2-methylimidazole, 1-(2-hydroxypropyl) imidazole, an amine adduct of 1-methylimidazole, an amine adduct of 2-methylimidazole, an amine adduct of 1-(2-hydroxypropyl) imidazole, and a microcapsule-type latent curing accelerator containing one or more of 1-methylimidazole, 2-methylimidazole, 1-(2-hydroxypropyl) imidazole, an amine adduct of 1-methylimidazole, an amine adduct of 2-methylimidazole, and an amine adduct of 1-(2-hydroxypropyl) imidazole.

11. The curable epoxy composition for a rotary electric machine according to claim 1, further comprising one or more antioxidants selected from the group consisting of: a phenol-based antioxidant, a hindered amine-based antioxidant, a phosphorous-based antioxidant, and a sulfur-based antioxidant.

12. The curable epoxy composition for a rotary electric machine according to claim 1, further comprising one or more polyhydric alcohols selected from the group consisting of ethylene glycol, diethylene glycol, propylene glycol, and glycerin.

13. The curable epoxy composition for a rotary electric machine according to claim 1, to be used for impregnating a stator coil of a rotary electric machine; or to be used for fixing a magnet, inserted into a hole in a rotor core of a rotary electric machine, to an inner wall of the hole.

14. The curable epoxy composition for a rotary electric machine according to claim 1, wherein the curable epoxy composition is liquid at 25° C.

15. A cured product of the curable epoxy composition for a rotary electric machine according to claim 1.

16. The cured product according to claim 15, having a bending strain of 4.4% or greater at 150° C.

17. A stator for a rotary electric machine, the stator comprising the cured product according to claim 15, the cured product being formed to cover a stator coil.

18. A rotor for a rotary electric machine, the rotor comprising the cured product according to claim 15 that covers a winding of the rotor.

* * * * *